(12) United States Patent
Plotkin et al.

(10) Patent No.: US 9,473,494 B2
(45) Date of Patent: Oct. 18, 2016

(54) ACCESS CREDENTIALS USING BIOMETRICALLY GENERATED PUBLIC/PRIVATE KEY PAIRS

(71) Applicants: Brian S. Plotkin, Plano, TX (US); Paul B. Bonham, McKinney, TX (US)

(72) Inventors: Brian S. Plotkin, Plano, TX (US); Paul B. Bonham, McKinney, TX (US)

(73) Assignee: Fujitsu Limited, Kawasaki (JP)

(*) Notice: Subject to any disclaimer, the term of this patent is extended or adjusted under 35 U.S.C. 154(b) by 60 days.

(21) Appl. No.: 14/151,558

(22) Filed: Jan. 9, 2014

(65) Prior Publication Data
US 2015/0195278 A1 Jul. 9, 2015

(51) Int. Cl.
*H04L 29/06* (2006.01)
*H04L 9/08* (2006.01)

(52) U.S. Cl.
CPC ......... *H04L 63/0861* (2013.01); *H04L 9/0861* (2013.01)

(58) Field of Classification Search
CPC .................. H04L 63/0861; H04L 9/0861
USPC ........................................................ 713/186
See application file for complete search history.

(56) References Cited

U.S. PATENT DOCUMENTS

| 6,035,398 | A * | 3/2000 | Bjorn ............................ 713/186 |
| 8,769,643 | B1 * | 7/2014 | Ben Ayed ........................ 726/5 |
| 2002/0186838 | A1 * | 12/2002 | Brandys ......................... 380/30 |
| 2008/0133967 | A1 * | 6/2008 | Lee et al. ......................... 714/6 |
| 2009/0310779 | A1 * | 12/2009 | Lam et al. ...................... 380/46 |
| 2013/0054756 | A1 * | 2/2013 | Do ............................... 709/219 |
| 2013/0080788 | A1 * | 3/2013 | Bacchiaz et al. ............. 713/186 |
| 2014/0237256 | A1 * | 8/2014 | Ben Ayed ..................... 713/186 |

OTHER PUBLICATIONS

B. Mjaaland et al.,. "Biocryptics: Towards Robust Biometric Public/Private Key Generation", *The Norwegian Information Security Conference (NISK)*, p. 27-41, 2009.
S. Pakala, "Using Biometrics to Generate Public and Private Keys", Texas A&M Graduate Projects, 51 pages; http://www.sci.tamucc.edu/~cams/GraduateProjects/view.php?view=266, Spring 2006.

* cited by examiner

*Primary Examiner* — Kambiz Zand
*Assistant Examiner* — Aubrey Wyszynski
(74) *Attorney, Agent, or Firm* — Baker Botts L.L.P.

(57) ABSTRACT

A method and system for access credential functionality using biometrically generated public/private key pairs may involve generating an asymmetric encryption key pair using a biometric scan of a human user and a server identifier of a network server. The public key of the key pair may be sent to the network server from a client device operated by the human user. The network server may use the public key to authenticate that the client device is in possession of the private key, thereby authenticating the human user.

13 Claims, 5 Drawing Sheets

FIG. 5

ACCESS CREDENTIALS USING BIOMETRICALLY GENERATED PUBLIC/PRIVATE KEY PAIRS

BACKGROUND

1. Field of the Disclosure

The present disclosure relates to computer network security and, specifically, to access credentials using biometrically generated public/private key pairs.

2. Description of the Related Art

Among the types of access credentials that are typically used to provide secure access to users of computer networks and associated network services provided by network servers, the combination of a user identification ("user ID") and password, typically provided as two separate text input fields, is one mechanism that has been widely adopted. From the perspective of network security providers, the user ID/password access credential mechanism is relatively simple to implement for large numbers of users while appearing to provide adequate security, and has accordingly become a de-facto standard implementation in many public and private networks and associated network servers.

Consequently, modern network users each typically interact with a large number of network servers, often on a daily basis over the Internet, to participate in network services that have become widely available, including, for example, shopping, financial services, subscriptions, and social networking, as non-limiting examples among others. However, from a user perspective, the preponderance of user ID/password pairs associated with individual service providers presents very real challenges that may undermine the very security such conventional access credentials seek to establish. Unfortunately, the memory capacity of the human brain is limited in the ability to effectively handle the myriad of information resulting from a user's large number of user ID/password pairs, as well as the associated network server information. So-called 'best practices' for user ID/password management promulgated by security experts further add complexity to the information management challenge by suggesting, at a minimum, that users provide different user ID/password combinations for each and every network server visited. Furthermore, additional constraints on passwords, such as requirements for a mix of upper case and lower case letters, numbers, symbols, etc., may differ widely among individual network servers. The resulting information management problem often overwhelms individual users and commonly leads to the result that many users do not follow best-practice guidelines and/or use a separate password manager tool, which, in turn, may actually create additional security vulnerabilities.

Another disadvantage with user ID/password management is the secure storage and retention of private user information by network service providers who maintain active user accounts. Since such private user information may enable access to critical financial information, the data repositories of nearly all network service providers are subject to continuous network attack by malicious entities who are regularly successful in exploiting vast numbers of stolen user records for nefarious purposes. Accordingly, the user ID/password access credential mechanism may be inherently limited in the ability to provide secure access credentials for very large populations of users using large numbers of network servers.

Therefore, there is a need in the art for access credentials that minimize or eliminate private data management by users and are not subject to the security vulnerabilities associated with the retention of private user information.

SUMMARY

In one aspect, a disclosed method includes receiving, from a human user, a request to access a network server. The method may include sending a connection request to the network server. Responsive to the connection request, the method may further include receiving, from the network server, an authentication request directed to the human user. The authentication request may include a server identifier associated with the network server. Responsive to the authentication request, the method may still further include receiving a biometric scan associated with the human user. Using the biometric scan and the server identifier, the method may also include generating an encryption key pair consisting of a public key and a private key.

In various embodiments, the method includes sending the public key to the network server and receiving an authentication challenge from the network server. Using the private key, the method may include decrypting the authentication challenge to generate an authentication response, and sending the authentication response to the network server.

Additional disclosed aspects for access credential functionality using biometrically generated public/private key pairs include a network server, a client device, and an article of manufacture comprising non-transitory computer readable memory media storing processor-executable instructions.

DESCRIPTION OF PARTICULAR EMBODIMENT(S)

In the following description, details are set forth by way of example to facilitate discussion of the disclosed subject matter. It should be apparent to a person of ordinary skill in the field, however, that the disclosed embodiments are exemplary and not exhaustive of all possible embodiments.

As noted previously, conventional methods for providing access credentials using user ID/password combinations, and/or variations thereof, may be subject to disadvantages for users and service providers. In particular, management of private user information by users, by virtue of the large amount of information that modern network users are associated with, may result in ineffective security and may be impractical for human users. Furthermore, storage and retention of repositories of private user information by network service providers may be inherently subject to certain security risks, such as intrusion, loss, theft and/or other malicious activities.

Concurrently, the use of biometrics to create public/private encryption key pairs is known. The inventors of the present disclosure have discovered a method to provide access credentials for a network server using biometrically generated public/private key pairs. As will be described in further detail, the methods and systems described herein may be used to identify a user of a network server and/or to validate the identity of the user while providing certain advantages over conventional user ID/password access credential mechanisms.

Figure 1:
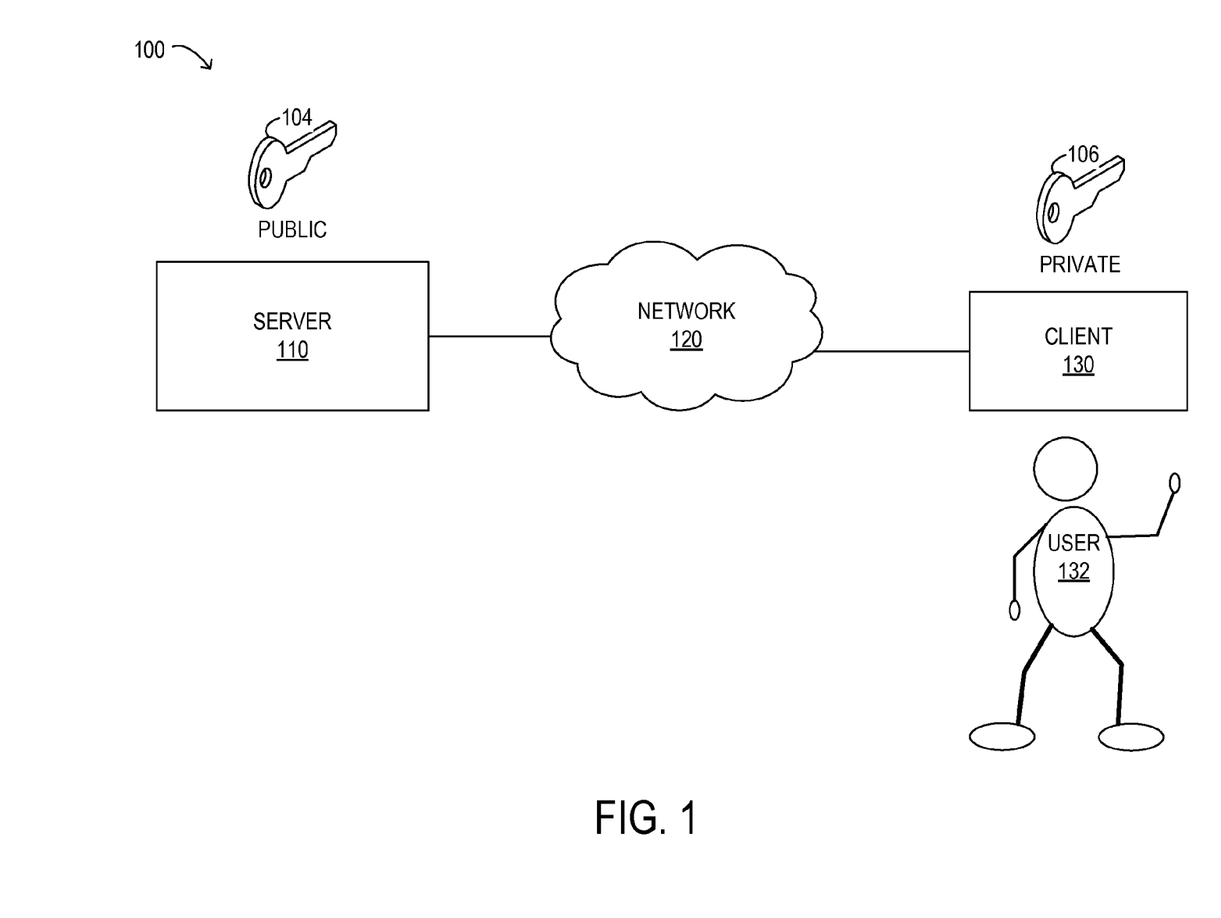
FIG. 1 is a block diagram of selected elements of an embodiment of a network system for access credential functionality using biometrically generated public/private key pairs.

Turning now to the drawings, FIG. 1 is a block diagram showing selected elements of an embodiment of network system 100. As shown, network system 100 may be representative of a wide range of network systems used by users to obtain various types of network services. As will be described in further detail, network system 100 may provide access credentials using biometrically generated public/private key pairs.

As shown in FIG. 1, server 110 may represent functionality associated with a network server that provides any of a variety of network services via network 120. For example, when network 120 includes the Internet, server 110 may include a web server for hosting an Internet web site. When network 120 includes a private network, server 110 may host private applications and/or network services. As noted, network 120 may represent any of a variety of different types of communication networks, and may include galvanic (i.e., wired), optical and/or wireless networks, as desired. In various embodiments, network 120 is used to provide services to a plurality of clients 130, which may be located at various distances from server 110. Accordingly, network 120 may include local area networks (LANs) and/or wide area networks (WANs) and/or combinations thereof. As shown, client 130 may represent a computing device used by user 132, who is assumed to be a human person. Client 130 may accordingly represent a mobile device or a stationary device at a fixed network location (see also FIG. 2). In various embodiments, client 130 represents a personal computing device in possession of user 132.

In operation of network system 100, client 130 and server 110 may be enabled for access credential functionality using biometrically generated public/private key pairs, as described herein. User 132 may use client 130 to navigate to a network resource provided by a service provider operating server 110. The network resource may be a network service, such as a website, remote access to a computer system, a storage resource, a multimedia streaming service, among other non-limiting examples. In particular embodiments, the network resource may be accessed using a network address, such as a universal resource locator (URL), by user 132. Upon receiving a connection request at server 110 from client 130, server 110 may send an authorization request to client 130 including a server identifier associated with server 110. The authorization request may be analogous to a conventional access credential request for a user ID/password. However, upon receiving the authorization request, client 130 may prompt user 132 to perform a biometric scan using a biometric device (not shown in FIG. 1, see FIG. 2) associated with client 130. The biometric scan may be any of a variety of scans that convert unique biometric information of user 132 into a binary large object (BLOB) of user-specific biometric data (i.e., a biometric scan). The unique biometric scan may be obtained from a biometric device that scans a fingerprint, a palm print, a blood vessel pattern, an iris, and/or a facial pattern, as non-limiting examples of biometric indicators that may be used to generate the BLOB.

Then, in network system 100, client 130 may generate a key pair consisting of public key 104 and private key 106 using the biometrically generated BLOB (i.e., the biometric scan) and the server identifier for server 110. The server identifier may be generated at server 110 and may represent a unique value for identifying server 110 in various communication protocols. In this manner, public key 104 and private key 106 are generated to be unique to both user 132 and server 110. In various embodiments, different algorithms may be used to generate public key 104 and private key 106. Then, public key 104 may be sent by client 130 to server 110. In various embodiments, server 110 may, in response to receiving the connection request from client 130 on behalf of user 132, attempt to look up a previously generated instance of public key 104 that is specific to user 132. Subsequently, server 110 may present an authentication challenge to client 130 that is encrypted using public key 104 and which may only be responded to (i.e., decrypted) using private key 106. Client 130 may then decrypt the authentication challenge using private key 106 and may encrypt an authentication response to the authentication challenge using private key 106. Server 110 may then receive the authentication response and may be able to decrypt the authentication response using public key 104, at which point user 132 may be authenticated and may be granted access credentials for accessing server 110. It is noted that by virtue of sending only public key 104 to server 110, no private or identifying information, including the biometrically generated BLOB, for user 132 has been disclosed or transmitted by client 130. In fact, client 130 may perform the procedure outlined above without storing BLOB in a non-volatile memory and may immediately discard BLOB upon generating the key pair consisting of public key 104 and private key 106. It is further noted that the access credential procedure using biometrically generated public/private keys described above may be easily integrated into existing access credential functionality, for example, by directly replacing executable code for obtaining and validating a user ID/password combination associated with user 132.

In addition to the access credential functionality using biometrically generated public/private key pairs described above to gain access to networks services provided by server 110 by client 130, the successful generation of the key pair consisting of public key 104 and private key 106 may enable additional functionality. For example, an entity associated with server 110 may send an electronic message (i.e., an email, a text message, etc.) to user 132 that is encrypted using public key 104 and that may only be decrypted using private key 106, thereby allowing for secured and authenticated communication with user 132. With the consent of user 132, a third-party network service may be employed by server 110 to manage and/or handle the authentication process. Furthermore, the access credential functionality using biometrically generated public/private key pairs described above may enhance overall security associated with server 110 in that public key 104 is secure from divulging any private information about user 132, absent additional identifying information. Additionally, even if server 110 were compromised by a malicious attack and the secured encryption of public key 104 was somehow compromised, the amount of computing resources required would be significant and such a security breach would be limited to private information for user 132. Thus, the computing effort for such a malicious attack would scale linearly for each individual user associated with server 110 and may thus represent an effective and inherent deterrent to such attacks or even attempts at such attacks.

As noted above, network system 100 depicted in FIG. 1 may represent any of a variety of network systems in which access credential functionality using biometrically generated public/private key pairs may be implemented in different embodiments. For example, client 130 may represent a personal mobile device in possession of user 132, such as a smart phone where network 120 includes a cellular wireless network. Network system 100 may represent a LAN within an organization using industry-standard network services, such as Active Directory Services (Microsoft) and/or Lightweight Directory Access Protocol (Internet Engineering Task Force—IETF), which may be customized for access credential functionality using biometrically generated public/private key pairs. Network system 100 may represent a client/server application, such as an enterprise-scale database system for resource planning and execution, such as SAP or Oracle that is modified for access credential functionality using biometrically generated public/private key pairs. Network system 100 may represent a government application, such as healthcare.gov or a similar application.

In still other embodiments, certain portions of network system 100 may be embedded in specific hardware or infrastructure components. For example, server 110 may be a building automation server that provides access to a building and/or a restricted area within a premises with access credential functionality using biometrically generated public/private key pairs. In other examples, server 110 may be enabled to provide specific access to particular physical passageways, such as hotel rooms, hospital rooms, cruise ship cabins, etc., with access credential functionality using biometrically generated public/private key pairs. In still other examples, server 110 may be operated in conjunction with automated kiosks, such as automated teller machines (ATMs), airline check-in machines, etc., with access credential functionality using biometrically generated public/private key pairs.

Figure 2:
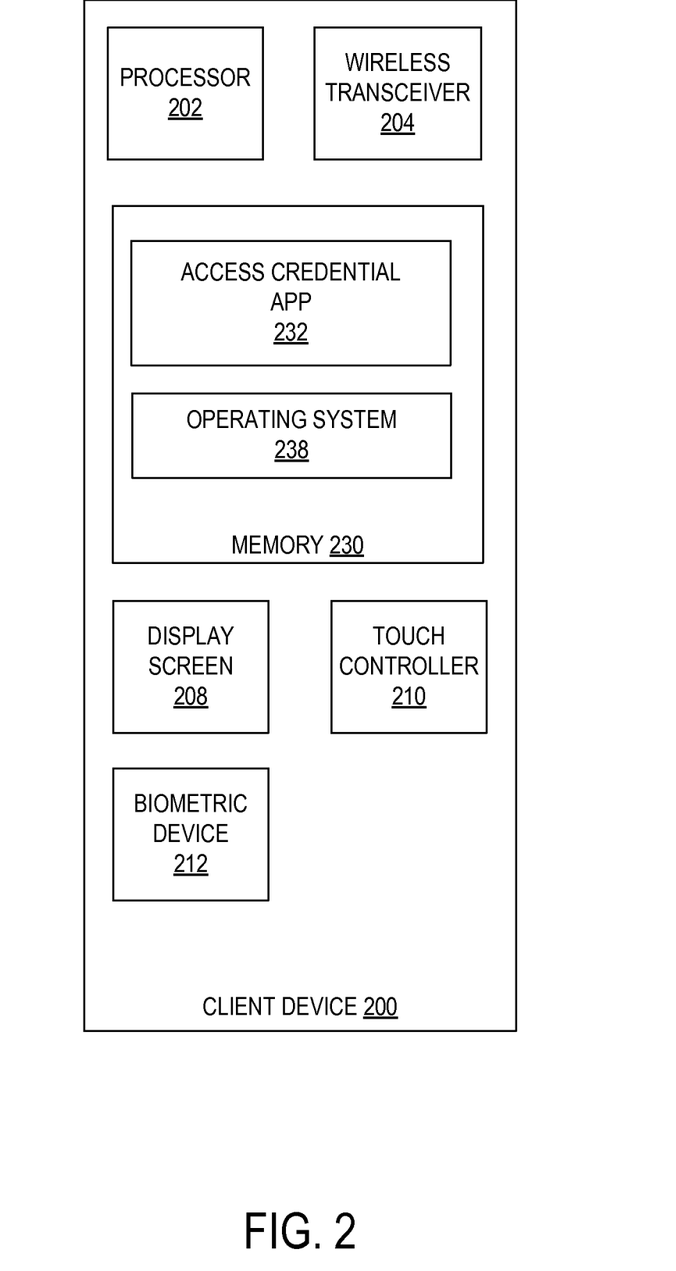
FIG. 2 is a block diagram of selected elements of an embodiment of a client device for access credential functionality using biometrically generated public/private key pairs.

Referring now to FIG. 2, a block diagram of selected elements of an embodiment of client device 200 is depicted. Client device 200 may represent an embodiment of client 130 (see FIG. 1). In the embodiment depicted in FIG. 2, client device 200 may represent any of a variety of mobile devices with communication and data processing capability. In other embodiments, client device 200 may be implemented as a fixed computing device, such as a personal computer system. In various embodiments, client device 200 is a smart phone that may include various functionality selected from: cellular telephony, wireless networking, location sensing, motion sensing, digital imaging (i.e., a camera), touch screen operation, multimedia playback, data storage, among others. Accordingly, while certain aspects of client device 200 are shown in FIG. 2 for descriptive purposes, it will be understood that in different embodiments, client device 200 may include different types of functionality.

As shown in FIG. 2, client device 200 includes processor 202 and memory 230 that may store data and/or instructions executable by processor 202. Memory 230 is shown including operating system 238, which may represent a mobile operating system being executed by processor 202. Examples of instances of operating system 238 include iOS (Apple Inc.) and Android™ (Google Inc.). Also, memory 230 may store access credential app 232 that is executable by processor 202 for access credential functionality using biometrically generated public/private key pairs, as described herein (see also FIG. 3). Memory 230 may also store other data (not shown) that may include demographic data for a user (not shown in FIG. 2, see FIG. 1) of client device 200. It is noted that various apps executing on client device 200 may be configured to access diverse types of functionality included with client device 200, such as, but not limited to, imaging, communication, location-based services, gestures, touch input, motion of client device 200, Internet-connectivity, etc.

In FIG. 2, client device 200 may include at least one instance of wireless transceiver 204, which may provide wireless connectivity to various types of wireless networks, such as cellular telephony networks (e.g., 3G, 4G, LTE), wireless local area networks (e.g., IEEE 802.11), wireless personal area networks (e.g., Bluetooth®), among others. Display screen 208 and touch controller 210 may operate in combination to provide a touch-screen display for output to and control by the user. Client device 200 is also shown including at least one instance of biometric device 212, which may be used to generate a biometric scan (i.e., a BLOB) uniquely associated with the user. In certain embodiments, client device 200 may receive the biometric scan from an instance of biometric device 212 that is external to client device 200.

Figure 3:
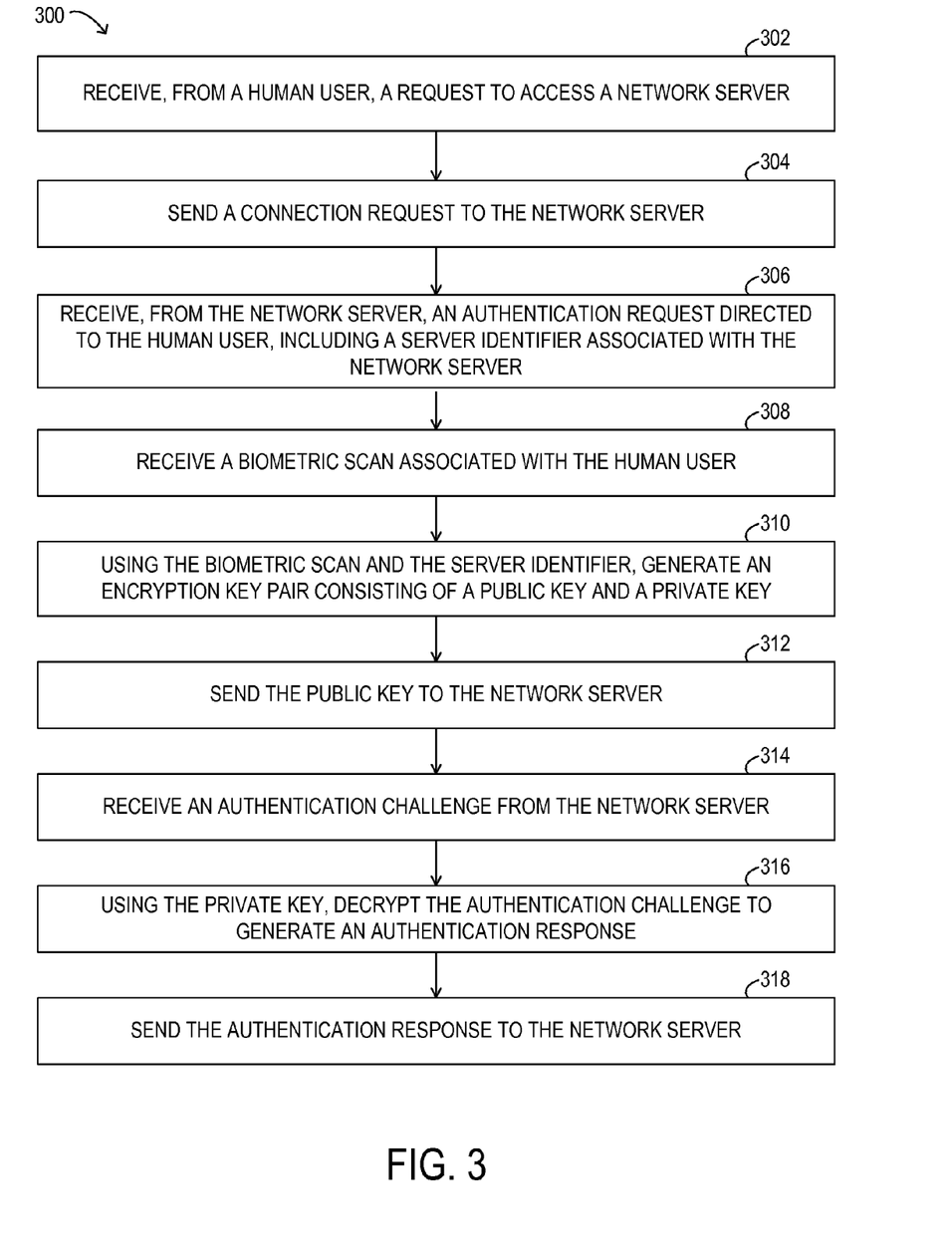
FIG. 3 is a flowchart depicting selected elements of an embodiment of a method for access credential functionality using biometrically generated public/private key pairs.

Turning now to FIG. 3, a block diagram of selected elements of an embodiment of method 300 for access credential functionality using biometrically generated public/private key pairs is depicted in flow-chart form. Method 300 may be performed by access credential app 232, for example, using client device 200 (see FIG. 2). It is noted that certain operations described in method 300 may be optional or may be rearranged in different embodiments.

Method 300 may begin by receiving (operation 302), from a human user, a request to access a network server. For example, the request may be in the form of a URL entered into a web browser or selection of a link to a website. A connection request may be sent (operation 304) to the network server. An authentication request may be received (operation 306) from the network server, including a server identifier associated with the network server. The authentication request may be to authenticate (i.e., to validate) an identity of the human user. Responsive to receiving the authentication request in operation 306, a biometric scan associated with the human user may be received (operation 308). Operation 308 may include prompting the human user at the client device to perform a biometric scanning operation using a biometric device. Using the biometric scan and the server identifier, an encryption key pair consisting of a public key and a private key may be generated (operation 310). The generation of the encryption key pair in operation 310 may be performed using methods for asymmetric key generation. Then, the public key may be sent (operation 312) to the network server. Operation 312 may be performed in response to the authentication request received in operation 306. An authentication challenge may be received (operation 314) from the network server. It may be assumed that the authentication challenge has been encrypted by the network server using the public key. Using the private key, the authentication challenge may be decrypted to generate an authentication response. The authentication response may then be sent (operation 318) to the network server. In certain embodiments, the authentication response is encrypted at the client device using a second public key generated by the network server and obtained in advance by the client device, which may be useful in providing additional security from malicious intermediaries in the communication path between the network server and the client device. In particular embodiments, the second public key is received at the client device along with the authentication request in operation 306. The authentication response may serve to authenticate to the network server that the client is in possession of the private key, and, correspondingly, that the identity of the human user is confirmed (i.e., validated and/or authenticated).

Figure 4:
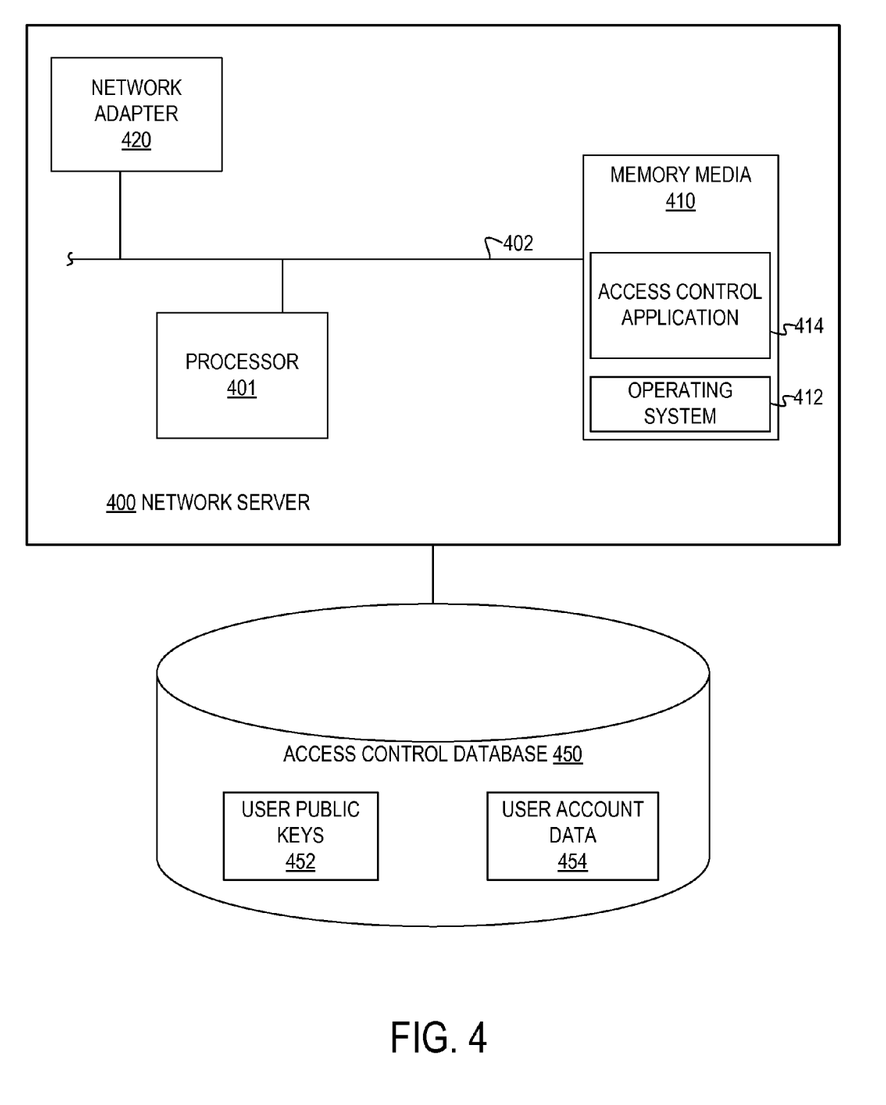
FIG. 4 is a block diagram of selected elements of an embodiment of a network server for access credential functionality using biometrically generated public/private key pairs.

Referring now to FIG. 4, a block diagram showing selected elements of an embodiment of network server 400 is illustrated. Network server 400 may represent an embodiment of server 110 (see FIG. 1). As depicted in FIG. 4, network server 400 includes processor 401 and memory media 410, which may communicate using system bus 402. Also shown accessible via system bus 402 is network adapter 420 that may provide connectivity to a network.

As shown in FIG. 4, memory media 410 may represent volatile, non-volatile, fixed, and/or removable media, and may be implemented using magnetic and/or semiconductor memory. Memory media 410 is capable of storing instructions and/or data. As shown, memory media 610 stores instructions (i.e., code executable by processor 401) including operating system 412 and access control application 414. Operating system 412 may be any of a variety of operating systems, such as a UNIX variant, LINUX, a Microsoft Windows® operating system, or a different operating system. Access control application 414 may embody various applications and functionality, for example, as described in method 500 (see FIG. 5) for server-side access credential functionality using biometrically generated public/private key pairs. Also shown in FIG. 4 is access control database 450, which may be linked to network server 400 for providing structured data storage. Access control database 450 may store user public keys 452 and user account data 454 for a plurality of users. In various embodiments, user public keys 452 may be stored independently from user account data 454 so that no private user information may be obtained from a public key stored in user public keys 452. It is noted that, in certain embodiments, access control database 450 may be included with network server 400.

Figure 5:
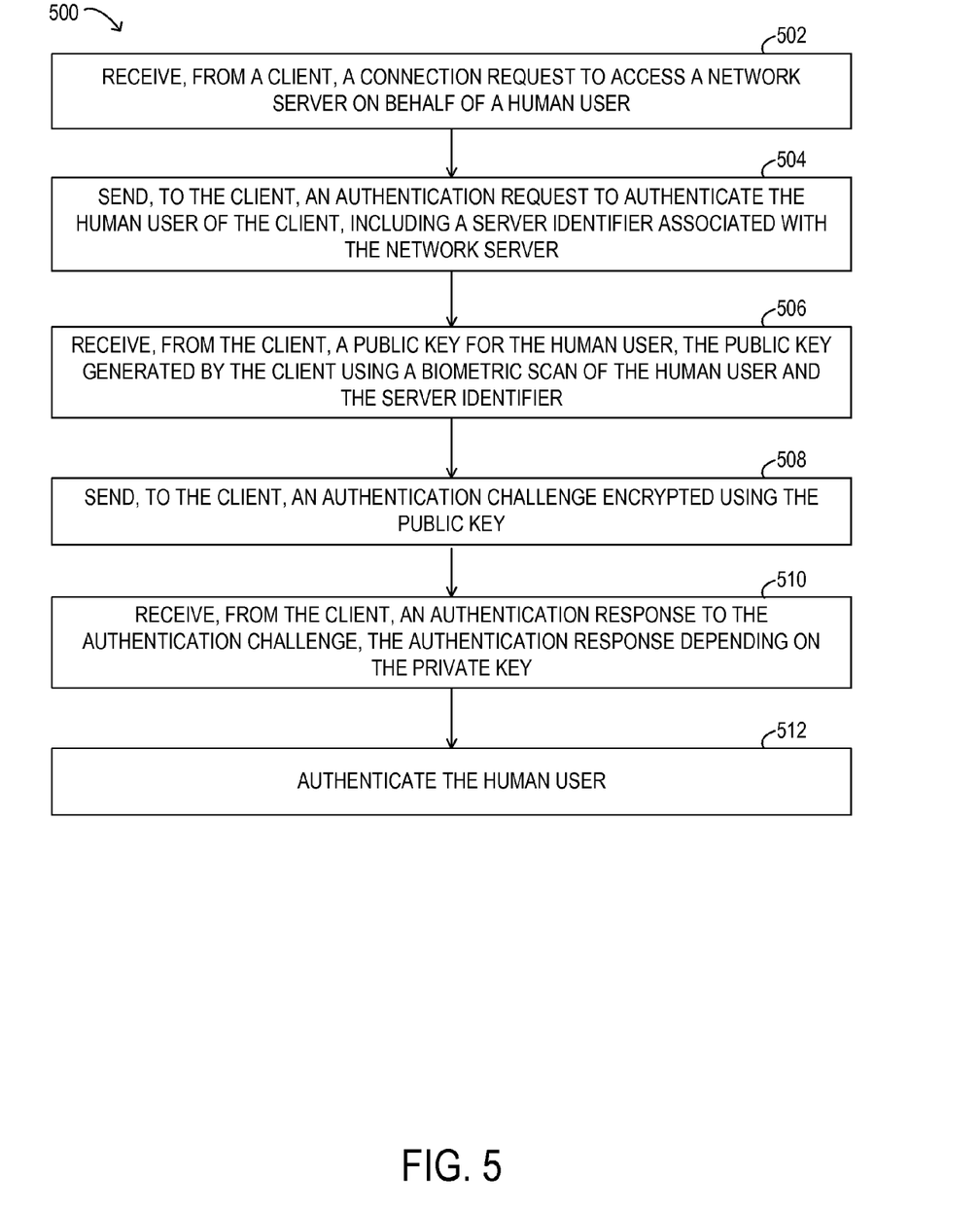
FIG. 5 is a flowchart depicting selected elements of an embodiment of a method for access credential functionality using biometrically generated public/private key pairs.

Turning now to FIG. 5, a block diagram of selected elements of an embodiment of method 500 for access credential functionality using biometrically generated public/private key pairs is depicted in flow-chart form. Method 500 may be performed by access control application 414, for example, using network server 400 (see FIG. 4). It is noted that certain operations described in method 500 may be optional or may be rearranged in different embodiments.

Method 500 may begin by receiving (operation 502), from a client, a connection request to access a network server on behalf of a human user. An authentication request including a server identifier associated with the network server may be sent (operation 504) to the client to authenticate the human user. A public key for the human user may be received (operation 506) from the client, the public key being generated by the client using a biometric scan of the human user and the server identifier associated with the network server. An authentication challenge may be sent (operation 508) to the client, the authentication challenge encrypted using the public key. In certain embodiments, a second public key generated at the network server may be sent to the client along with the authentication challenge in operation 508. An authentication response to the authentication challenge may be received (operation 510) from the client, the authentication response depending on the private key. In other words, a successful authentication response may indicate that the client is in possession of the private key. When the second public key is sent to the client in operation 508, the client may encrypt the authentication response using the second public key in operation 510, as noted previously. After receiving the authentication response, the human user may be authenticated (operation 512).

As described herein a method and system for access credential functionality using biometrically generated public/private key pairs may involve generating an asymmetric encryption key pair using a biometric scan of a human user and a server identifier of a network server. The public key of the key pair may be sent to the network server from a client device operated by the human user. The network server may use the public key to authenticate that the client device is in possession of the private key, thereby authenticating the human user.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for authentication comprising:
    receiving, from a human user, a request to access a network server;
    sending a connection request to the network server;
    receiving from the network server, responsive to the connection request, an authentication request directed to the human user, the authentication request including a server identifier associated with the network server;
    receiving, responsive to the authentication request, a biometric scan associated with the human user;
    generating, using the biometric scan and the server identifier, an encryption key pair consisting of a public key and a private key;
    sending the public key to the network server;
    receiving an authentication challenge encrypted with the public key from the network server;
    decrypting, using the private key, the authentication challenge to generate an authentication response;
    sending the authentication response to the network server; and
    receiving, based on the authentication response, an authentication that indicates that access to the network server is granted for the human user.

2. The method of claim 1, wherein receiving the biometric scan associated with the human user includes:
    initiating a biometric scanning operation to generate the biometric scan.

3. The method of claim 1, wherein the server identifier is generated at the network server.

4. The method of claim 1, wherein generating the encryption key pair includes:
    deleting the biometric scan after generating the public key and the private key.

5. A client device for authentication, comprising:
    a processor having access to memory media; and
    a network adapter for communicating with a network server, wherein the memory media store processor-executable instructions that, when executed by the processor, cause the processor to:
  receive, from a human user, a request to access the network server;
  send a connection request to the network server;
  receive from the network server, responsive to the connection request, an authentication request directed to the human user, the authentication request including a server identifier associated with the network server;
  receive, responsive to the authentication request, a biometric scan associated with the human user;
  generate, using the biometric scan and the server identifier, an encryption key pair consisting of a public key and a private key;
  send the public key to the network server;
  receive an authentication challenge encrypted with the public key from the network server;
  decrypt, using the private key, the authentication challenge to generate an authentication response;
  send the authentication response to the network server; and
  receive, based on the authentication response, an authentication that indicates that access to the network server is granted for the human user.

6. The client device of claim 5, wherein the instructions to receive the biometric scan associated with the human user include instructions to:
  communicate with a biometric device to generate the biometric scan.

7. The client device of claim 5, wherein the server identifier is generated at the network server.

8. The client device of claim 5, wherein the instructions to generate the encryption key pair include instructions to:
  delete the biometric scan after generating the public key and the private key.

9. The client device of claim 5, wherein the network adapter includes a wireless network adapter.

10. An article of manufacture comprising non-transitory computer readable memory media storing processor-executable instructions, the instructions, when executed by a processor, cause the processor to:
  receive, from a human user, a request to access a network server;
  send a connection request to the network server;
  receive from the network server, responsive to the connection request, an authentication request directed to the human user, the authentication request including a server identifier associated with the network server;
  receive, responsive to the authentication request, a biometric scan associated with the human user;
  generate, using the biometric scan and the server identifier, an encryption key pair consisting of a public key and a private key;
  send the public key to the network server;
  receive an authentication challenge encrypted with the public key from the network server;
  decrypt, using the private key, the authentication challenge to generate an authentication response;
  send the authentication response to the network server; and
  receive, based on the authentication response, an authentication that indicates that access to the network server is granted for the human user.

11. The article of manufacture of claim 10, wherein the instructions to receive the biometric scan associated with the human user include instructions to:
  communicate with a biometric device to generate the biometric scan.

12. The article of manufacture of claim 10, wherein the server identifier is generated at the network server.

13. The article of manufacture of claim 10, wherein the instructions to generate the encryption key pair include instructions to:
  delete the biometric scan after generating the public key and the private key.

* * * * *